(12) United States Patent
Gritti (10) Patent No.: US 10,727,734 B2
(45) Date of Patent: Jul. 28, 2020

(54) CONTROL UNIT OF A SWITCHING CONVERTER OPERATING IN CONTINUOUS-CONDUCTION AND PEAK-CURRENT-CONTROL MODE

(71) Applicant: STMicroelectronics S.r.l., Agrate Brianza (IT)

(72) Inventor: Giovanni Gritti, Bergamo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 15/916,697

(22) Filed: Mar. 9, 2018

(65) Prior Publication Data

US 2018/0278152 A1    Sep. 27, 2018

(30) Foreign Application Priority Data

Mar. 21, 2017    (IT) .......................... 102017000031159

(51) Int. Cl.
*H02M 1/42* (2007.01)
*H02M 3/156* (2006.01)
*H02M 1/00* (2006.01)

(52) U.S. Cl.
CPC ......... *H02M 1/4225* (2013.01); *H02M 3/156* (2013.01); *H02M 2001/007* (2013.01);
(Continued)

(58) Field of Classification Search
CPC ............... H02M 1/4225; H02M 3/156; H02M 2001/0025; H02M 2001/007; H02M 2001/0009; H02M 2001/0022; H02M 2001/0019; H02M 1/08; H02M 1/083; H02M 2001/0058; H02M 1/14;
(Continued)

(56) References Cited

U.S. PATENT DOCUMENTS 6,288,524 B1    9/2001  Tsujimoto
6,388,429 B1    5/2002  Mao
(Continued)

FOREIGN PATENT DOCUMENTS

CN    102843039 A    12/2001
CN    204615631 U    9/2015
(Continued)

*Primary Examiner* — Gustavo A Rosario-Benitez
(74) *Attorney, Agent, or Firm* — Seed IP Law Group LLP (57) ABSTRACT

A control unit for a switching converter has an inductor element coupled to an input and a switch element coupled to the inductor element and generates a command signal having a switching period to switch the switch element and determine a first time period in which an inductor current is flowing in the inductor element for storing energy and a second time period in which energy is transferred to a load. An input current is distorted relative to a sinusoid by a distortion factor caused by current ripple on the inductor current. The duration of the first time period is determined based on a comparison between a peak value of the inductor current and a current reference that is a function of an output voltage of said voltage converter. A reference modification stage modifies one of the current reference and sensed value of the inductor current to compensate for distortion introduced by the distortion factor on the input current.

21 Claims, 8 Drawing Sheets

(52) U.S. Cl.
CPC .............. *H02M 2001/0022* (2013.01); *H02M 2001/0025* (2013.01); *Y02B 70/126* (2013.01)

(58) Field of Classification Search
CPC .......... H02M 1/143; H02M 1/15; H02M 1/42; H02M 1/44; H02M 3/04; H02M 3/158
See application file for complete search history.

(56) References Cited

U.S. PATENT DOCUMENTS

| | | | | |
|---|---|---|---|---|
| 7,719,248 | B1* | 5/2010 | Melanson | H02M 1/4225 323/283 |
| 9,431,894 | B2 | 8/2016 | Li et al. | |
| 9,621,029 | B2 | 4/2017 | Gritti | |
| 2004/0095101 | A1 | 5/2004 | Pidutti et al. | |
| 2006/0103364 | A1* | 5/2006 | Adragna | H02M 1/4225 323/282 |
| 2008/0067993 | A1* | 3/2008 | Coleman | H02M 1/08 323/282 |
| 2010/0109615 | A1 | 5/2010 | Hwang et al. | |
| 2010/0301827 | A1* | 12/2010 | Chen | H02M 3/156 323/299 |
| 2012/0051107 | A1* | 3/2012 | Choi | H02M 1/4208 363/126 |
| 2012/0268095 | A1 | 10/2012 | Wu | |
| 2013/0051090 | A1* | 2/2013 | Xie | H02M 1/4258 363/21.17 |
| 2013/0063107 | A1* | 3/2013 | Nishida | H02M 3/1588 323/271 |
| 2013/0070485 | A1* | 3/2013 | Li | H02M 1/4225 363/21.01 |
| 2014/0197811 | A1* | 7/2014 | Qiu | H02M 3/1582 323/282 |
| 2014/0198542 | A1* | 7/2014 | Swamy | H02M 1/4225 363/37 |
| 2014/0369097 | A1 | 12/2014 | Prescott et al. | |
| 2015/0311778 | A1* | 10/2015 | Chang | H02M 1/143 363/21.16 |
| 2015/0378378 | A1* | 12/2015 | Zhang | G05F 1/56 323/280 |

FOREIGN PATENT DOCUMENTS

| | | |
|---|---|---|
| CN | 105391296 A | 3/2016 |
| CN | 105991050 A | 10/2016 |

* cited by examiner

CONTROL UNIT OF A SWITCHING CONVERTER OPERATING IN CONTINUOUS-CONDUCTION AND PEAK-CURRENT-CONTROL MODE

BACKGROUND

Technical Field

The present disclosure relates to a control circuit or unit of a switching converter, in particular (but not limited to) a power factor correction (PFC) converter. In particular, the control unit is a voltage converter operating in continuous conduction mode (CCM) and peak-current-control mode.

Description of the Related Art

In a known manner, voltage converters used in power supplies operating in switched mode (switched-mode power supplies, or SMPS), for example in desktop computers, LED lighting devices or electromedical devices, usually need to satisfy strict requirements regarding the related electrical performance.

In particular, such converters must guarantee a high quality factor, with a substantially unitary power factor (PF), for example greater than 0.9, and a total harmonic distortion (THD) of the input current that is ideally zero.

In general, such voltage converters are able to convert an input magnitude received, for example an alternating voltage (AC) coming from the electricity network into a regulated output magnitude, for example a direct voltage (DC), which is then used to supply an electrical load.

In particular, the use of power converters having a two-stage architecture, in which a first stage is a PFC converter, typically a boost or step-up PFC converter, is known, for example where a high output power is required. The present PFC converter performs a step-up operation on the line alternating voltage, generating a continuously regulated output voltage. The PFC converter is controlled by a suitable control unit or module ("controller") to regulate the power factor in the absorption of the electric line.

Figure 1:
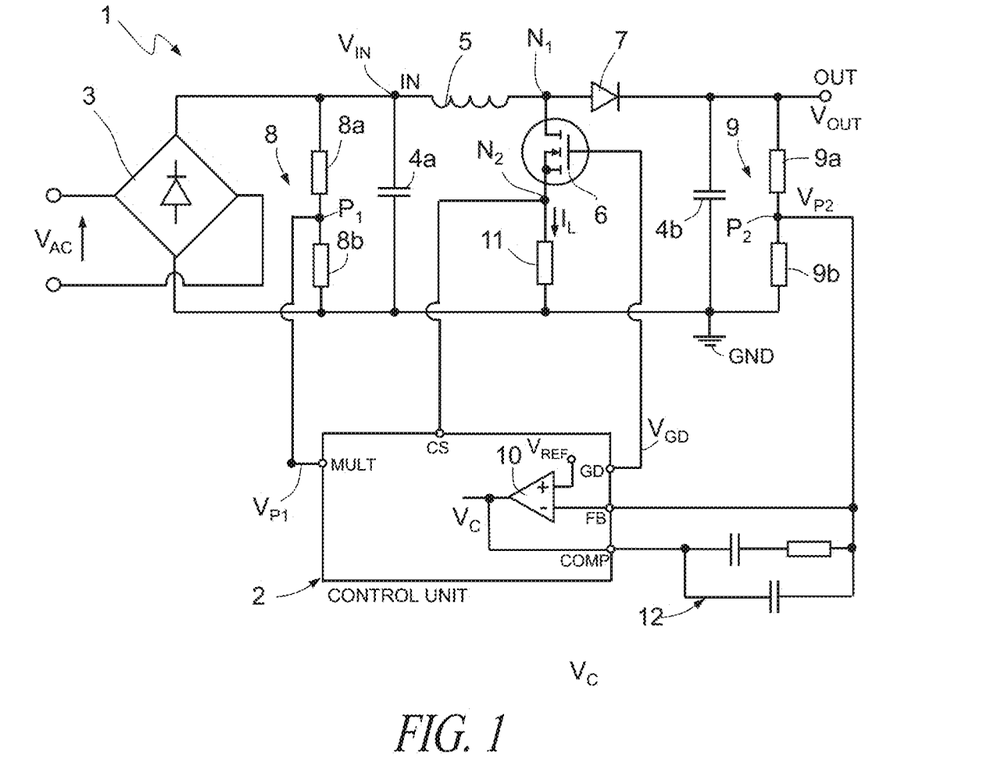
FIG. 1 shows an outline circuit diagram of a voltage converter and a related control unit of a known type.

FIG. 1 shows the wiring diagram of a voltage converter, in particular a PFC boost converter, indicated as a whole using reference sign 1, controlled by a related control unit or circuit or module, indicated using reference sign 2.

The control unit 2 is an integrated circuit and has its own package and related input and output pins. This integrated circuit can be mounted on a single printed circuit board (PCB) with the circuit components, or the respective integrated circuit, which form the voltage converter 1.

In particular and in this configuration, the voltage converter 1 has an input terminal IN on which there is an input voltage $V_{IN}$ (with a rectified sine wave form) generated by a rectifier stage 3 (shown schematically), for example a diode-bridge rectifier, from an alternating voltage $V_{AC}$, for example supplied by the electricity network, and an output terminal OUT, on which there is a continuous output voltage $V_{OUT}$ that is greater than the input voltage $V_{IN}$ and regulated to a desired value.

A filter capacitor 4a performing high-frequency filtering functions is connected to the input terminal IN, while a storage capacitor 4b performing charge storage functions is connected to the output terminal OUT. Both the filter capacitor 4a and the storage capacitor 4b are also connected to a reference or ground terminal (GND).

The voltage converter 1 includes an inductor element 5 connected between the input terminal IN and a first internal node $N_1$, a switch element 6, in particular a MOSFET power transistor, connected between the first internal node $N_1$ and a second internal node $N_2$, and a diode element 7 having an anode connected to the first internal node $N_1$ and a cathode connected to the output terminal OUT.

The switch element 6 has a first current conduction terminal, in particular the drain terminal of the respective MOSFET transistor, connected to the first internal node $N_1$, a second current conduction terminal, in particular the source terminal of the respective MOSFET transistor, connected to the second internal node $N_2$, and a control terminal, which is the gate terminal of the respective MOSFET transistor.

A first voltage divider 8 is connected between the input terminal IN and the reference terminal, formed by a first divider resistor 8a connected in series to a second divider resistor 8b, forming a first divider node $P_1$, from which is drawn a first division voltage $V_{P1}$, equal to $K_p \cdot V_{IN}$, where $K_p$ is the division factor of the first voltage divider 8.

Furthermore, a second voltage divider 9 is connected between the output terminal OUT and the reference terminal, formed by a respective first divider resistor 9a, connected in series to a respective second divider resistor 9b, forming a second division node $P_2$, from which is drawn a second division voltage $V_{P2}$.

The voltage converter 1 also includes a sensing resistor 11 connected in series to the switch element 6 between the second internal node $N_2$ and the reference terminal, a voltage at the ends of the aforementioned sensing resistor 11 is indicative of the current $I_L$ flowing through the switch element 6 when closed, after passing through the inductor element 5 (henceforth, this current is referred to as the inductor current $I_L$, for the sake of brevity). The aforementioned voltage is therefore given by $R_s \cdot I_L$, where Rs is the resistance of the sensing resistor 11.

The control unit 2 has an input (or pin) MULT designed to be connected to the first division node $P_1$ and to receive the first division voltage $V_{P1}$, an input COMP designed to be connected to the second division node $P_2$ via a compensation network 12, an input FB connected to the same second division node $P_2$ and designed to receive the second division voltage $V_2$, an input CS designed to be coupled to the second internal node $N_2$ and on which there is a sensing voltage $V_{CS}$ (which is in this case the same as the voltage at the ends of the sensing resistor 11), and an output GD designed to be connected to the control terminal of the switch element 6 and to provide a command voltage $V_{GD}$ to command the switching of said switch element 6 using pulse width modulation (PWM) with appropriate timing.

The control unit 2 includes an error amplifier 10 having a first input connected to the input FB, receiving the second division voltage $V_2$, a second input receiving a voltage reference $V_{REF}$, and an output on which same generates a comparison voltage $V_C$ as a function of the difference (or error) between the aforementioned division voltage $V_2$ and the aforementioned voltage reference $V_{REF}$.

The control unit 2 may be configured to control operation of the voltage converter 1 in continuous-conduction mode (CCM) with peak current control.

In particular, with each switching cycle, the control unit 2 commands the switch element 6 to close for an on time period $T_{ON}$ ('ON' period of the duty cycle), during which the current coming from the input terminal IN is flowing in the inductor element 5 and in the switch element 6 to ground, resulting in energy being stored in said inductor element 5.

In peak-current-control mode, the duration (or term) of the on time period $T_{ON}$ is stabilized by the control unit 2 using a suitable feedback control loop based on the voltage at the ends of the sensing resistor 11, indicative of the value of the inductor current $I_L$, which is compared with a suitable reference voltage (as described in detail below). This reference voltage determines a desired current reference to be compared to the peak value of the aforementioned inductor current $I_L$.

The control unit 2 then commands the switch element 6 to open for an off time period $T_{OFF}$ ('OFF' period of the duty cycle), during which the energy previously stored in the inductor element 5 is transferred to the load and to the charge storage element 4b, via the diode element 7.

In particular, the duration of the off time period $T_{OFF}$ may be fixed (in a control mode referred to as fixed off time or FOT), or determined such that it is the PWM switching frequency that is fixed (in a control mode referred to as PWM fixed frequency or FF).

In any case, continuous-conduction mode provides for the inductor current $I_L$ to be greater than zero at all times, for the entire duration of the switching period (unlike discontinuous-conduction mode DCM, which conversely involves the presence of a portion of the off time period $T_{OFF}$ of the switching period in which the inductor current $I_L$ is zero).

Figure 2:
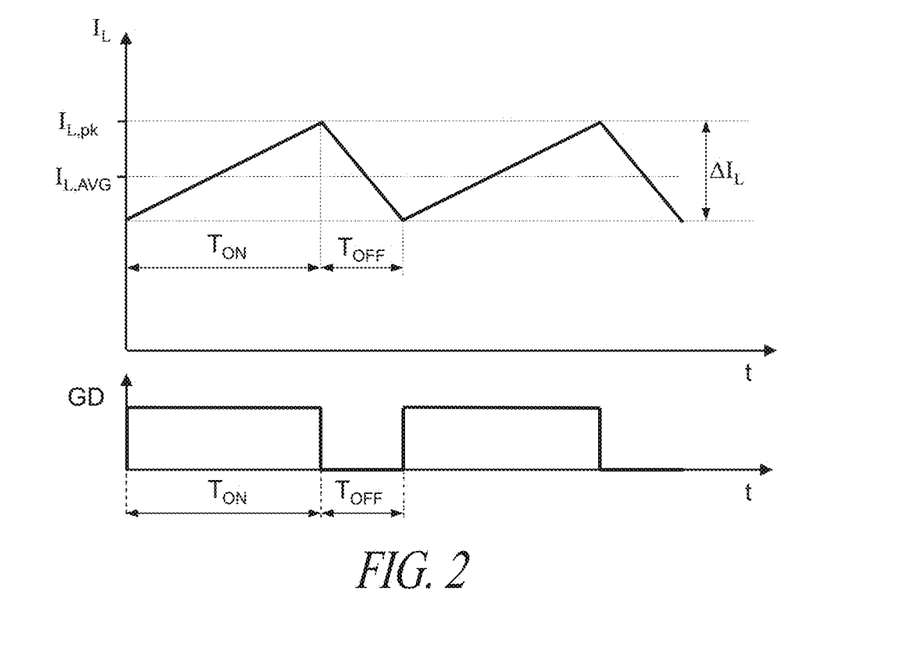
FIG. 2 is a signal timing diagram of electrical magnitudes related to the voltage converter in FIG. 1.

FIG. 2 shows the trends, relating to the continuous-conduction control mode (CCM) described above, of the current $I_L$ in the inductor element 5 and of the command signal GD, showing the on time period $T_{ON}$, during which energy is stored in the inductor element 5, and the off time period $T_{OFF}$. FIG. 2 also shows $I_{L,pk}$, representing the peak value of the inductor current $I_L$ (determined, as indicated above, by the value of the reference voltage), and $\Delta I_L$ representing the current ripple of said inductor current $I_L$ caused by PWM switching control. On the other hand, $I_{L,AVG}$ represents the mean value of said inductor current $I_L$.

A known embodiment of a control unit 2 of the voltage converter 1 (not shown again here) implementing the control method discussed above is described below in greater detail with reference to FIG. 3.

The control unit 2 includes a multiplier stage 14 connected to the input MULT and to the input COMP and designed to implement the product of the first division voltage $V_{P1}$ and the comparison voltage $V_C$, with a degree of multiplication $K_M$, to generate the aforementioned reference voltage, indicated with $V_{CS\_REF}$, therefore given by the following expression:

$V_{CS\_REF}(\theta) = V_C \cdot K_M \cdot K_P \cdot V_{in,pk} \cdot \sin \theta;$ It should be noted that the input voltage $V_{IN}$ can be considered to be substantially a rectified sinusoid, or $V_{IN}(\theta) = V_{IN,pk} \cdot \sin \theta$, where $\theta$, phase angle, is within the range (0, π).

The control unit 2 also includes a comparator stage 15 and a flip-flop or set/reset SR latch 16. The comparator stage 15 has a first comparison terminal (for example positive), on which there is a comparison voltage V', a second comparison terminal (in the example, negative) connected to the output of the multiplier stage 14 and receiving the reference voltage $W_{CS\_REF}$, and an output that generates the reset signal for the SR latch 16.

In this case, the first comparison terminal is directly coupled to the input CS and the comparison voltage V' is the same as the sensing voltage $V_{CS}$ and the voltage at the ends of the sensing resistor 11 (variable over time and with phase angle $\theta$).

The SR latch 16 therefore has a reset input R connected to the output of the comparator stage 15, a set input S connected to a timer stage 18 that generates the set signal S at the appropriate time and on the basis of an appropriate determination of the duration of the off time period $T_{OFF}$ (for example in FOT or FF mode, see previous discussion), and an output Q that supplies a command signal transformed by a drive unit (driver) 19 into the command voltage $V_{GD}$, at the output GD, to command the switching of the switch element 6.

The operation of the control unit 2 therefore involves the output Q of the SR latch 16 becoming periodically low, determining the end of the on time period $T_{ON}$ and the beginning of the off time period $T_{OFF}$, when the comparison voltage V', a function of the peak value $I_{L,pk}$ of the inductor current $I_L$, has a predetermined ratio to the reference voltage $V_{CS\_REF}$, making the reset signal for the reset input R high (in other words, the peak value $I_{L,pk}$ of the inductor current $I_L$ is determined by the current reference provided by the value of the reference voltage $V_{CS\_REF}$). The output Q becomes high, determining the end of the off time period $T_{OFF}$ and the new beginning of the on time period $T_{ON}$, when the timer stage 18 switches the set signal for the set input S of said SR latch 16, on the basis of the determination of the duration of the off time period $T_{OFF}$.

As can be easily demonstrated, the peak value of the inductor current $I_L$ (at the end of the on time period $T_{ON}$) is given by:

$$I_{L,pk}(\theta) = \frac{V_{CS_{REF}}(\theta)}{R_S} = \frac{V_C \cdot K_M \cdot K_P \cdot V_{in,pk} \cdot \sin\theta}{R_S} = I_{LPK} \sin\theta;$$

This peak value therefore has a sinusoidal trend in that, during use and in consideration of the sufficiently narrow band of the compensation network 12, for example less than 20 Hz, the comparison voltage $V_C$ can be considered to be substantially constant (or a continuous value) in a line cycle.

The input current $I_{IN}$, that is absorbed by the power supply network, which is the same as the mean value of the inductor current $I_L$ in the switching period, is equal to:

$$I_{IN}(\theta) = I_{L,pk}(\theta) - \frac{\Delta I_L(\theta)}{2}$$

The above expression can demonstrably be rewritten as follows:

$$I_{IN}(\theta) = I_{LPK}\sin(\theta) - \frac{\Delta I_{L,MAX}}{2} \cdot (1 - K_V \sin\theta) \cdot K_V \sin\theta$$

in which:

$$\Delta I_{L,MAX} = \frac{V_{OUT}}{4Lf_{SW}}$$

$$K_V = \frac{V_{in,pk}}{V_{OUT}}$$

where $f_{SW}$ is the switching frequency, L is the inductance of the inductor element 5 and $V_{in,pk}$ is the peak value of the input voltage $V_{IN}$.

The above expression clearly shows that the trend in the input current $I_{IN}(\theta)$, specifically as a result of the ripple on the inductor current $I_L$, is not sinusoidal, thereby determining a power factor PF<1 and a distortion factor THD>0%, which is not desirable.

In particular, the values of the aforementioned power factor PF and of the aforementioned distortion factor THD may depart significantly from ideal values under certain operating conditions of the voltage converter 1.

The known solutions that provide for control based on the peak current in continuous-conduction mode (CCM) are therefore not entirely satisfactory.

Although there are other control solutions, for example based on controlling the average current, these solutions are more complex to implement and also typically require an additional pin in the control unit 2 to compensate the current-loop.

In other words, existing control solutions necessarily require a compromise between the distortion characteristics and the complexity/cost of implementation.

BRIEF SUMMARY

The purpose of the present disclosure is to address the problems set out above, and in particular to provide a control solution that enables improved performance of a control solution based on peak current in a converter (in particular a PFC boost converter) operating in continuous-conduction mode (CCM).

The present disclosure therefore provides embodiments of a control unit for a switching converter and corresponding embodiments of switching converters and methods.

BRIEF DESCRIPTION OF THE SEVERAL VIEWS OF THE DRAWINGS

The present disclosure is further described below with reference to preferred embodiments of same, which are provided purely as non-limiting examples, and to the attached drawings, in which.

DETAILED DESCRIPTION

Figure 4:
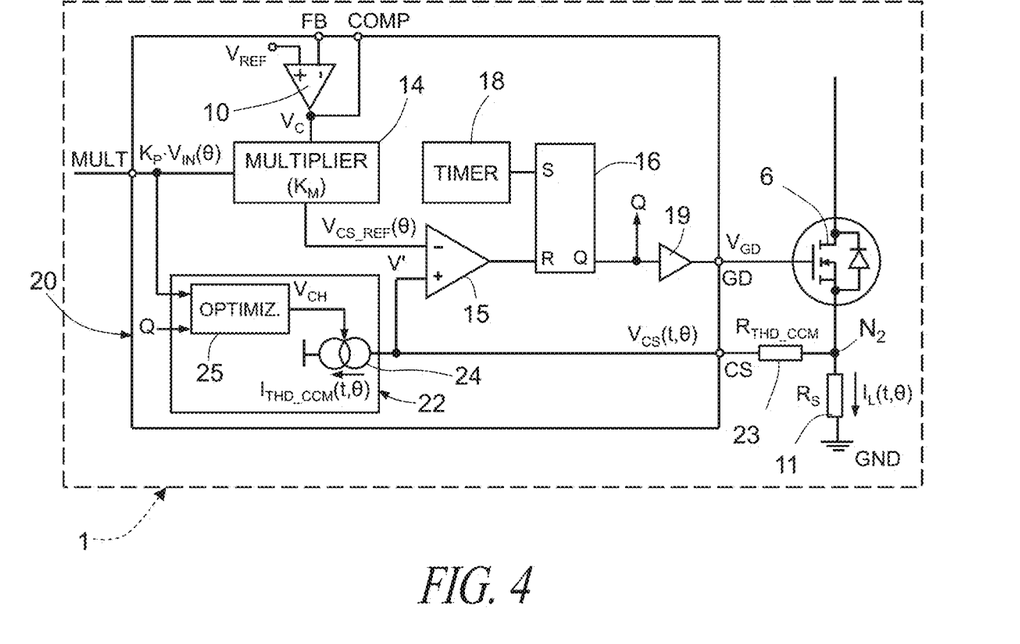
FIG. 4 shows a block diagram of a control unit of a switching converter, for example the same voltage converter shown in FIG. 1, according to one embodiment of the present solution.

FIG. 4 shows a control unit, indicated as a whole using reference sign 20, for a switching converter, in particular for controlling a voltage converter, and more particularly a PFC boost converter operating in continuous-conduction and peak-current-control mode. For the sake of simplicity in the illustration, FIG. 4 only shows the switch element 6 (with the associated sensing resistor 11) of the voltage converter, the rest of which may for example be similar to the voltage converter 1 in FIG. 1 (and is not illustrated again in FIG. 4).

Figure 3:
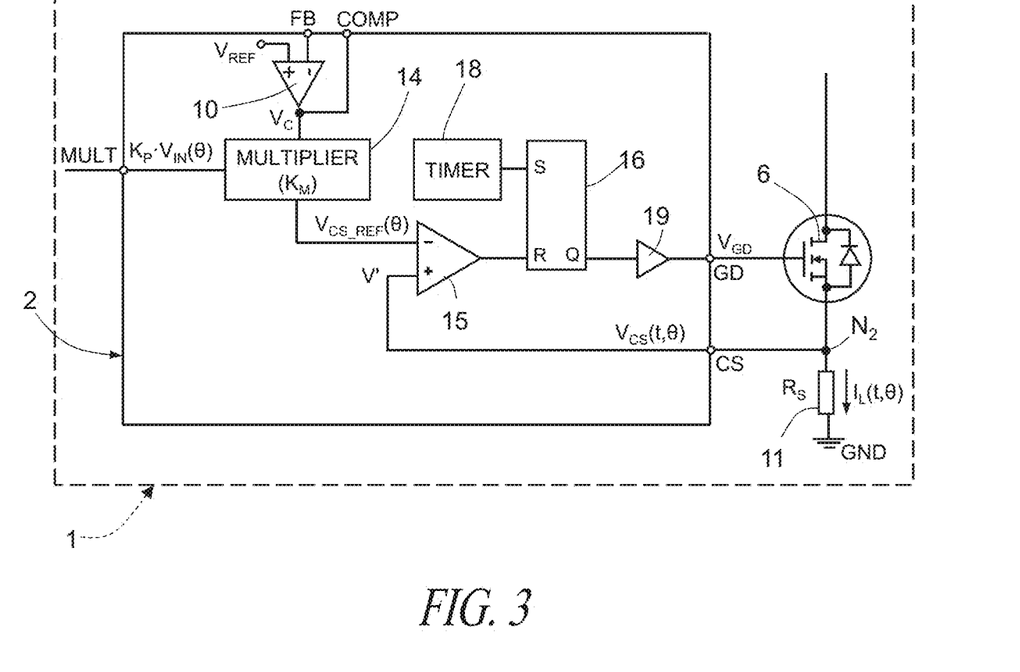
FIG. 3 shows a more detailed block diagram of the control unit of the voltage converter in FIG. 1.

The control unit 20 is in turn constructed in a substantially similar manner to the control unit 2 in FIG. 3 (similar elements are therefore illustrated using the same reference numbers, and are not discussed again), but differs in that it additionally includes a reference modification stage 22 coupled to the first comparison terminal of the comparator stage 15 (and to the input CS of the control unit 20).

As discussed in detail below, this reference modification stage 22 is configured to appropriately modify the current reference that is compared to the peak value of the inductor current $I_L$ in order to eliminate, or at least significantly reduce, the effect of the current ripple $\Delta I_L$ on the expression of the input current $I_{IN}$, thereby obtaining a distortion factor THD that is ideally zero and a power factor PF that is ideally unitary.

In particular, given that, on the basis of the discussion above, the input current $I_{IN}$ may be expressed as:

$$I_{IN}(\theta) = I_{L,pk}(\theta) - \frac{\Delta I_L(\theta)}{2}$$

One aspect of the present solution provides for the addition, to the current reference used to compare the peak current, of a suitable offset proportional to the current ripple $\Delta I_L$, such as to cancel out the effect of said ripple on the aforementioned expression of the input current $I_{IN}$.

In other words, given that the aforementioned expression may also be expressed as follows:

$$I_{IN}(\theta) = \frac{V_{CS\_REF}(\theta)}{R_S} - \frac{\Delta I_L(\theta)}{2}$$

one aspect of the present solution provides for the addition to the reference voltage $V_{CS\_REF}$ of an offset voltage, $V_{OS,THD\_CCM}$ satisfying the following equation:

$$V_{OS,THD\_CCM}(\theta) \approx \frac{\Delta I_L(\theta)}{2} \cdot R_S$$

Consequently, the aforementioned expression becomes:

$$I_{IN}(\theta) = \frac{V_{CS\_REF}(\theta) + V_{OS,THD\_CCM}(\theta)}{R_S} - \frac{\Delta I_L(\theta)}{2}$$

and therefore:

$$I_{IN}(\theta) = \frac{V_{CS\_REF}(\theta)}{R_S} + \frac{V_{OS,THD\_CCM}(\theta)}{R_S} - \frac{\Delta I_L(\theta)}{2},$$

or:

$$I_{IN}(\theta) \approx \frac{V_{CS\_REF}(\theta)}{R_S} = I_{LPK}\sin\theta$$

The input current $I_{IN}$ is therefore ideally sinusoidal, as desired, enabling optimization of the performance of the voltage converter 1.

In particular, one aspect of the present solution provides for the generation of an optimization current $I_{THD\_CCM}$ that is a function of and in particular proportional to the current ripple $\Delta I_L$ in the inductor current $I_L$, and also provides for the generation of the aforementioned offset voltage $V_{OS,THD\_CCM}$ from the optimization current $I_{THD\_CCM}$, as the voltage drop generated by said optimization current $I_{THD\_CCM}$ on a resistor element, having an appropriate value, such that said offset voltage $V_{OS,THD\_CCM}$ satisfies the following equation.

In the embodiment shown in FIG. 4, the optimization current $I_{THD\_CCM}$ is absorbed ("sunk") by the input CS of the control unit 20, and an optimization resistor 23 having a resistance $R_{THD\_CCM}$ is connected between the second internal load $N_2$ and said input CS of the control unit 20. The following expression is then satisfied:

$$V_{OS,THD\_CCM}(\theta) = R_{THD\_CCM} \cdot I_{THD\_CCM}(\theta)$$

In greater detail, the reference modification stage 22 includes a first current source 24 that is voltage controlled by a command voltage $V_{CH}$ that is designed to generate the optimization current $I_{THD\_CCM}$ that is proportional to said command voltage $V_{CH}$, and an optimization circuit or block 25 having a first input coupled to the input MULT, from which the first division voltage $V_{P1}$ proportional to the input voltage $V_{IN}$ is received, and a second input coupled to the output Q of the SR latch 16, from which the related latch signal is received, also indicated using reference sign Q, corresponding to the on time period $T_{ON}$.

The optimization block 25 outputs the command voltage $V_{CH}$ for the first current source 24, which is proportional to the product of the aforementioned input voltage $V_{IN}$ and the aforementioned on time period $T_{ON}$:

$$V_{CH}(\theta) \alpha V_{IN}(\theta) \cdot T_{ON}(e).$$

Given that the current ripple $\Delta I_L$ is, in a known manner, given by the following:

$$\Delta I_L(\theta) = \frac{V_{IN}(\theta) T_{ON}(\theta)}{L_P}$$

the command voltage $V_{CH}$, and consequently the optimization current $I_{THD\_CCM}$, are proportional to said current ripple $\Delta I_L$ as desired, where the inductance $L_P$ is the inductance of the inductor element 5.

Figure 5:
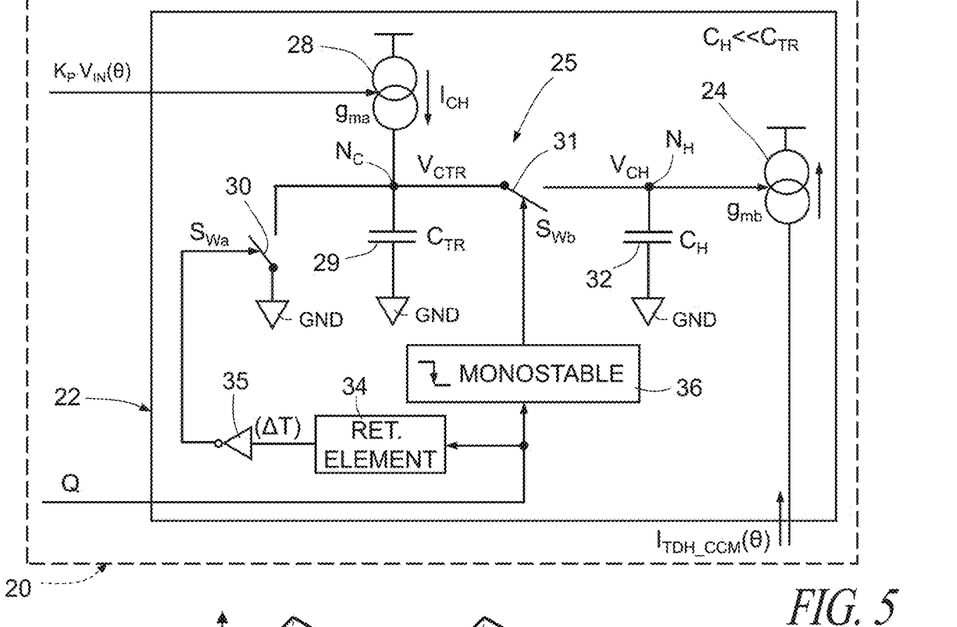
FIG. 5 shows a more detailed block diagram of a stage of the control unit in FIG. 4.

A possible embodiment of the optimization block 25 of the reference modification stage 22 of the control unit 20 is described below with reference to FIG. 5.

In detail, said optimization block 25 includes a second voltage-controlled current source 28 that receives the first division voltage $V_{P1}$ from the first input of said optimization block 25, as control voltage, and supplies a charging node $N_C$ with a charging current $I_{CH}$, the value of which is a function of the input voltage $V_{IN}$ according to the following expression:

$$I_{CH}(\theta) = g_{ma} K_P V_{IN}(\theta)$$

where $g_{ma}$ is the transconductance of the second current source 28.

The optimization block 25 also includes a charging capacitor 29 having a value or capacity $C_{TR}$ connected between the charging node $N_C$ and the reference ground terminal (again indicated as GND), a first switch element 30 driven by a first switching signal $SW_a$ connected between said charging node $N_C$ and the ground reference terminal in parallel with the charging capacitor 29, a second switch element 31 driven by a second switching signal $SW_b$ connected between said charging node $N_C$ and a maintenance node $N_H$, And a maintenance capacitor 32 having a capacity $C_H$ connected between the aforementioned maintenance node $N_H$ and the reference ground terminal.

In particular, there is a charge voltage $V_{CTR}$ on the charging node $N_C$ and a command voltage $V_{CH}$ on the maintenance node $N_H$, constituting the control voltage of the aforementioned first current source 24.

The optimization block 25 also includes a retarding element 34 that is connected to the second input of said optimization block 25, that receives the latch signal Q from same and that is designed to retard said latch signal Q by a suitable time delay AT, for example 200 ns, and an inverter element 35 that is connected in cascade to the retarding element 34 such as to receive the suitably retarded latch signal, outputting the first switching signal $SW_a$ for the first switch element 30.

The optimization block 25 also includes a monostable element 36 that is also connected to the second input of said optimization block 25, that receives the latch signal Q from same and that is designed to generate the second switching signal $SW_b$, as a pulse signal with an example duration of 100 ns, at the falling edge of said latch signal Q (or at the end of the on time period $T_{ON}$ and at the start of the off time period $T_{on}$).

In use, the charging capacitor 29 is charged during the on time period $T_{ON}$ with a charging current that is assumed to be constant (assuming that the switching period $T_{SW}$ is much less than the line period $T_L$, or the period of the input voltage $V_{IN}$, $T_{SW} \ll 1/f_L$) and proportional to the input voltage $V_{IN}$.

The charge voltage $V_{CTR}$ is therefore given by the following expression:

$$V_{CTR}(\theta) = \frac{I_{CH}(\theta)}{C_{TR}} \cdot T_{ON}(\theta) = \frac{g_{ma} K_P}{C_{TR}} \cdot V_{IN}(\theta) \cdot T_{ON}(\theta)$$

and is thus proportional to the input voltage $V_{IN}$ and to the on time period $T_{ON}$.

The maintenance capacitor 32 maintains the value of the voltage at the ends of the aforementioned charging capacitor 29 at the end of the on time period $T_{ON}$, at the falling edge of the latch signal Q, such that the command voltage $V_{CH}$ is also proportional to the input voltage $V_{IN}$ and to the on time period $T_{ON}$:

$$V_{CH}(\theta) = V_{CTR}(\theta) = \frac{g_{ma} K_P}{C_{TR}} \cdot V_{IN}(\theta) \cdot T_{ON}(\theta)$$

This command voltage $V_{CH}$ is thus transformed into the optimization current $I_{THD\_CCM}$ by the first current source 24, with the following expression:

$$I_{THD\_CCM}(\theta) = \frac{g_{ma} g_{mb}}{C_{TR}} K_P L_P \Delta I_L(\theta)$$

in which the expression of the current ripple $\Delta I_L$, which is a function of the input voltage $V_{IN}$ and of the on time period $T_{ON}$, as well as the inductance $L_P$ of the inductor element 5, has already been replaced.

In particular, and as desired, the optimization current $I_{THD\_CCM}$ is thus proportional to the current ripple $\Delta I_L$.

In light of the foregoing, it is also immediately clear that, by setting the resistance $R_{THD\_CCM}$ of the optimization resistor 23 such that the following expression is true:

$$R_{THD\_CCM} = \frac{1}{2} \frac{R_S}{L_P} \frac{1}{K_P} \frac{C_{TR}}{g_{ma} \cdot g_{mb}}$$

the input current $I_{IN}$ is given by:

$$I_{IN}(\theta) = I_{LPK} \cdot \sin\theta = \frac{1}{R_S} V_C K_M K_P V_{in,pk} \sin\theta$$

being therefore sinusoidal and in phase with the input voltage $V_{IN}$, assuming that the comparison voltage $V_C$ is constant in the line semi-period (this being the case in all cases with standard PFC converters).

This results in operation ideally having a unitary power factor (PF=1) and a zero distortion factor THD (THD=0), regardless of the current ripple $\Delta I_L$ on the inductor current $I_L$.

Figure 6A:
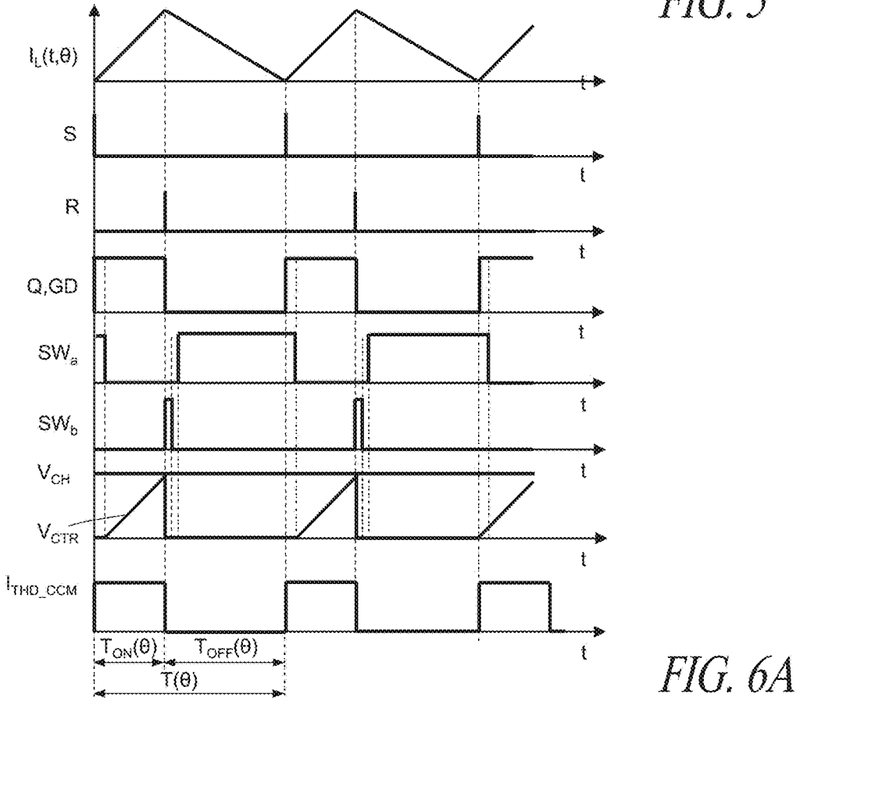
FIGS. 6A and 6B is a signal timing diagram of electrical magnitudes in the control unit in FIG. 4.
Figure 6B:
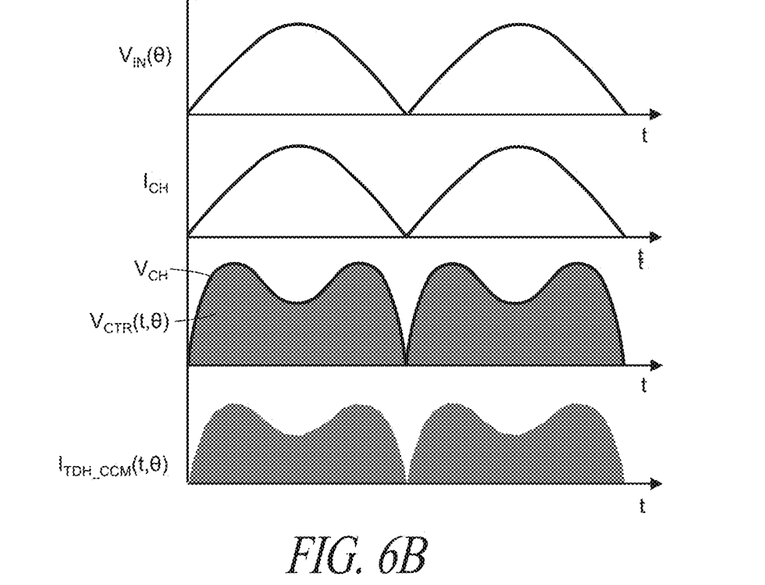

FIGS. 6A and 6B show the variations or trends of the signals of the most significant waveforms relating to operation of the control unit 20 described above.

It should in particular be noted that the delay introduced by the switching of the latch signal Q by closing the first switch element 30 enables the effective transfer of charge between the charging capacitor 29 and the maintenance capacitor 32, before said charging capacitor 29 is "reset" and the charge voltage $V_{CTR}$ returns to a zero value.

A different embodiment of the control unit, again indicated using reference sign 20, is described below with reference to FIG. 7.

This embodiment differs from the solution previously described in that the optimization current $I_{THD\_CCM}$ is supplied ("sourced") at the input CS of the control unit 2.

Indeed, in this case, current sensing is performed on the ground return of the inductor current $I_L$. In other words, the sensing resistor 11 is in this case connected between the second internal node $N_2$ (which is connected directly to the reference terminal) and a current return node $N_G$ (connected to the return node of the rectifier stage 3) and the optimization resistor 23 is connected between the aforementioned current return node $N_G$ and the input CS of the control unit 20.

Figure 7:
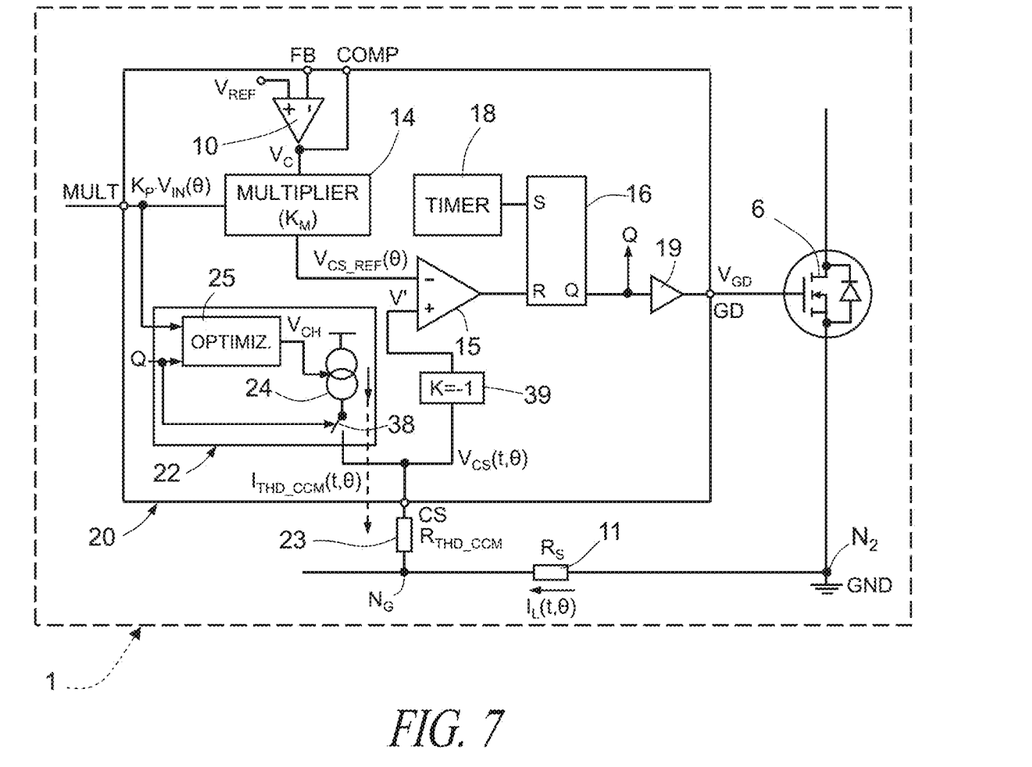
FIG. 7 is a block diagram of a control unit of a switching converter, for example the voltage converter shown in FIG. 1, according to another embodiment of the present solution.

Furthermore, in the embodiment shown in FIG. 7, there is an additional switch element 38 that is connected between the output of the first current source 24 and the input CS of the control unit 20, and driven by the latch signal Q.

Thus, advantageously, the optimization current $I_{THD\_CCM}$ is taken into consideration for control operations only during the on time period $T_{ON}$ of the switching period (thus replicating operation of the first embodiment described above).

Furthermore, in this case, there is a translator element 39 connected between the aforementioned input CS and the first comparison terminal of the comparator stage 15, configured to translate from negative to positive the sensing voltage $V_{CS}$ present at said input CS to generate the comparison voltage V' (thus again replicating operation of the first embodiment illustrated above).

It is immediately clear that the following expressions are also true in this case:

$$I_{L,pk}(\theta) = \frac{V_{CS,REF}(\theta) + V_{OS,THD\_CCM}(\theta)}{R_S}$$

$$V_{OS,THD\_CCM}(\theta) = R_{THD\_CCM} \cdot I_{THD\_CCM}(\theta)$$

Again, the optimization current $I_{THD\_CCM}$ enables a desired current offset to be added to the programmed peak current (or to the current reference) in order to optimize control performance.

The advantages of the solution proposed are clear from the above description.

In any case, it should again be noted that such a solution makes it possible to overcome the limitations of the control solutions of a known type, making it possible, inter alia, to obtain an input current $I_{IN}$ that is ideally sinusoidal and a distortion factor that is ideally zero (and in any case less than 5%) in a control solution based on the peak current in a voltage converter (in particular a PFC boost converter) operating in continuous-conduction mode (CCM).

The applicant has tested and checked the solution proposed using numerous experimental tests and simulations.

Figure 8:
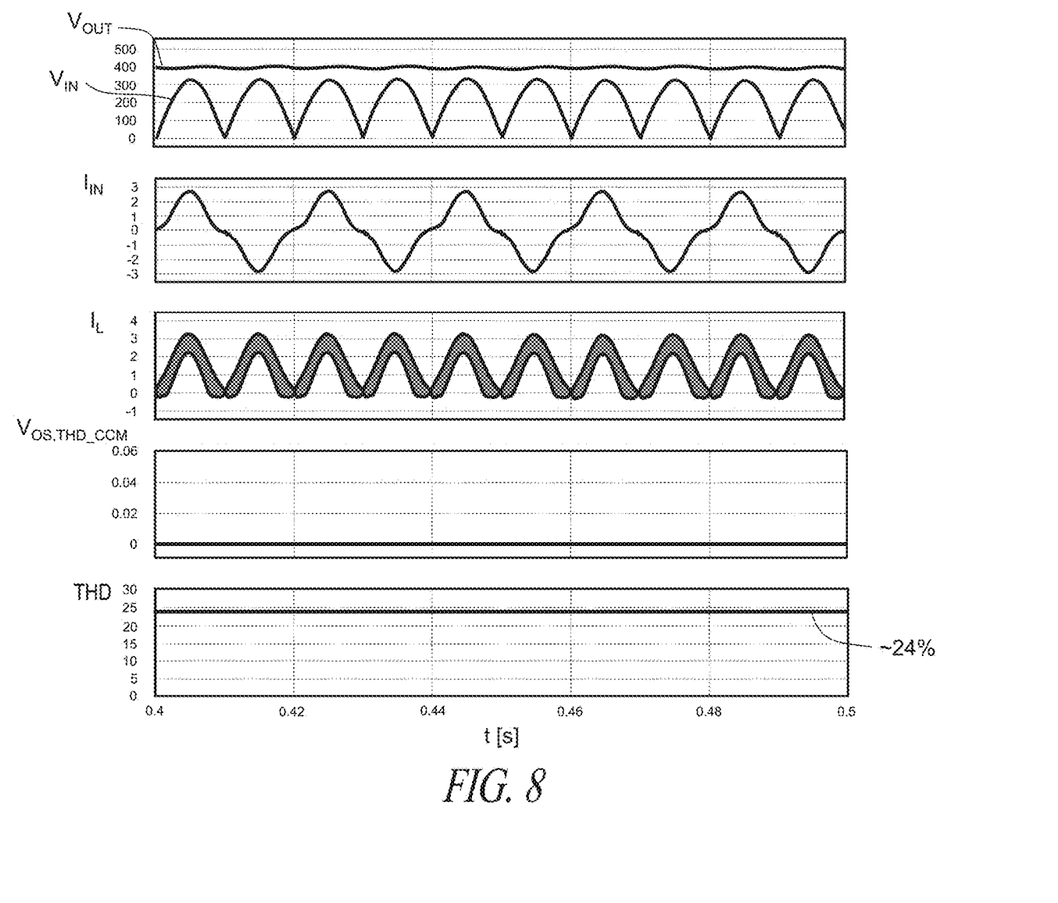
FIGS. 8 and 9 are signal diagrams showing the trend of electrical magnitudes of the control unit of a known type and respectively in control units according to the present solution.
Figure 9:
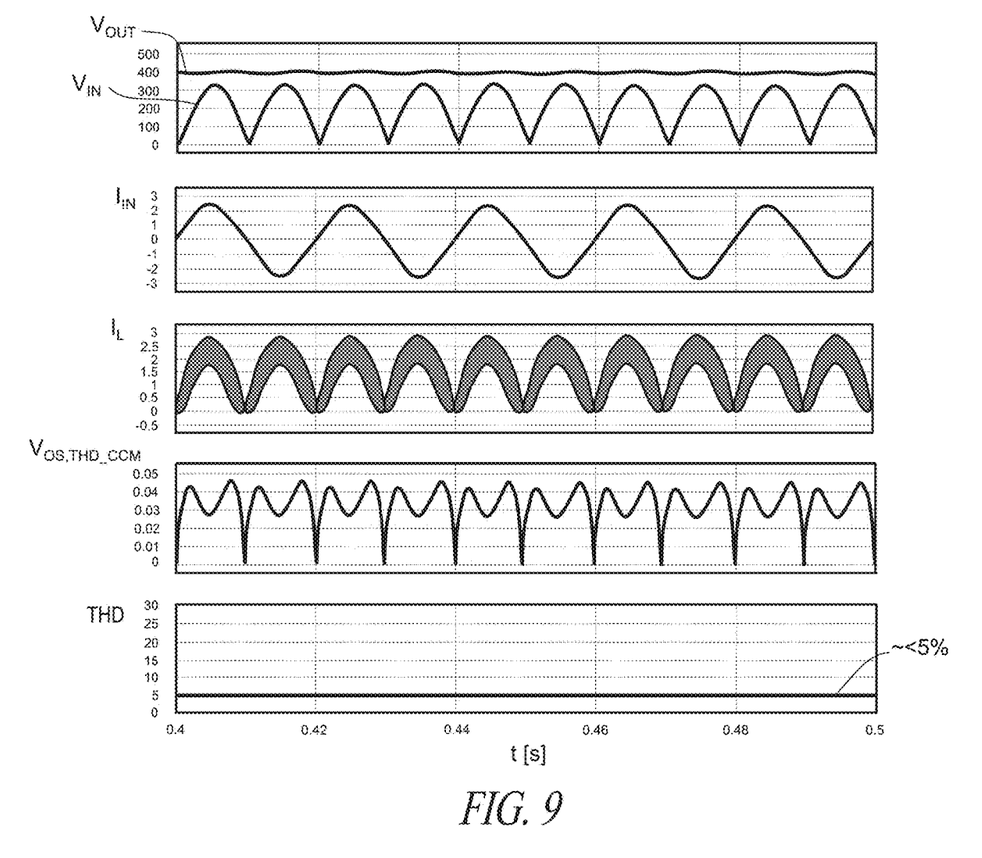

By way of example, FIGS. 8 and 9 compare the performance of a control unit according to the prior art (in particular, the control unit 2 in FIG. 3), shown in FIG. 8, and the performance of the control unit 20 according to the present solution, shown in FIG. 9.

In both cases, the voltage converter is working at full load, with an input alternating voltage $V_{AC}$ of 230 V.

It can be seen immediately that the solution proposed makes it possible to significantly reduce the distortion of the waveform, achieving a substantial reduction in the distortion factor THD, from around 24% (in the traditional solution) to less than 5% (in the proposed solution), with a power factor PF of 0.981 (substantially unitary). Although not illustrated, the applicant has verified the possibility of obtaining a distortion factor of 1.2% with a power factor PF of 0.995, where the input alternating voltage $V_{AC}$ is 115 V.

Figure 10:
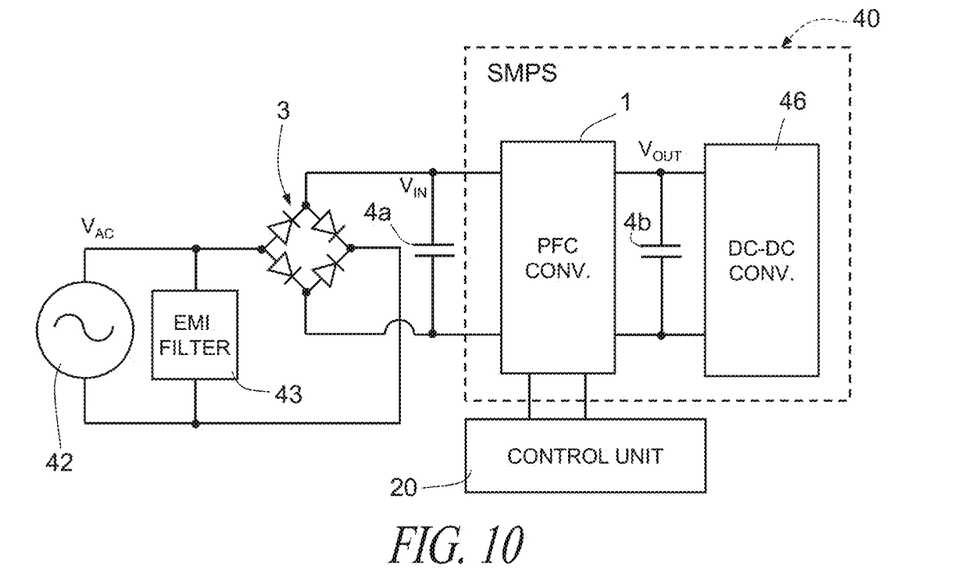
FIG. 10 is a general block diagram of an electronic device using the voltage converter according to embodiments of the present solution.

As indicated above, the voltage converter 1 and the related control unit 20 may advantageously be used in a switched power supply 40, as shown in FIG. 10.

In particular, the switched power supply 40 includes the rectifier stage 3 (for example a diode-bridge rectifier) connected to the electricity network 42, in this example via an EMI filter 43, and the input capacitor element 4a, connected to the output of the rectifier stage 3, on which there is the input voltage $V_{IN}$.

The switched power supply 40 also includes the voltage converter 1, having an input terminal IN connected to the input capacitor element 4a and an output terminal OUT connected to the charge storage element 4b, as defined above.

The control unit 20 controls operation of the voltage converter 1, such as to ensure a desired power factor in the absorption of the electrical network 42.

The switched power supply 40 also includes an output power converter 46, in the example a DC/DC converter, having an input connected to the output capacitor element 4b that is designed to provide a load or end user (not shown) with a desired output voltage value, for example a value appropriately reduced in relation to the value of the output voltage $V_{OUT}$.

It is evident that modifications and variations may be made to the subject matter described and illustrated without thereby moving outside the scope of protection of the present disclosure, as defined in the attached claims.

Figure 11:
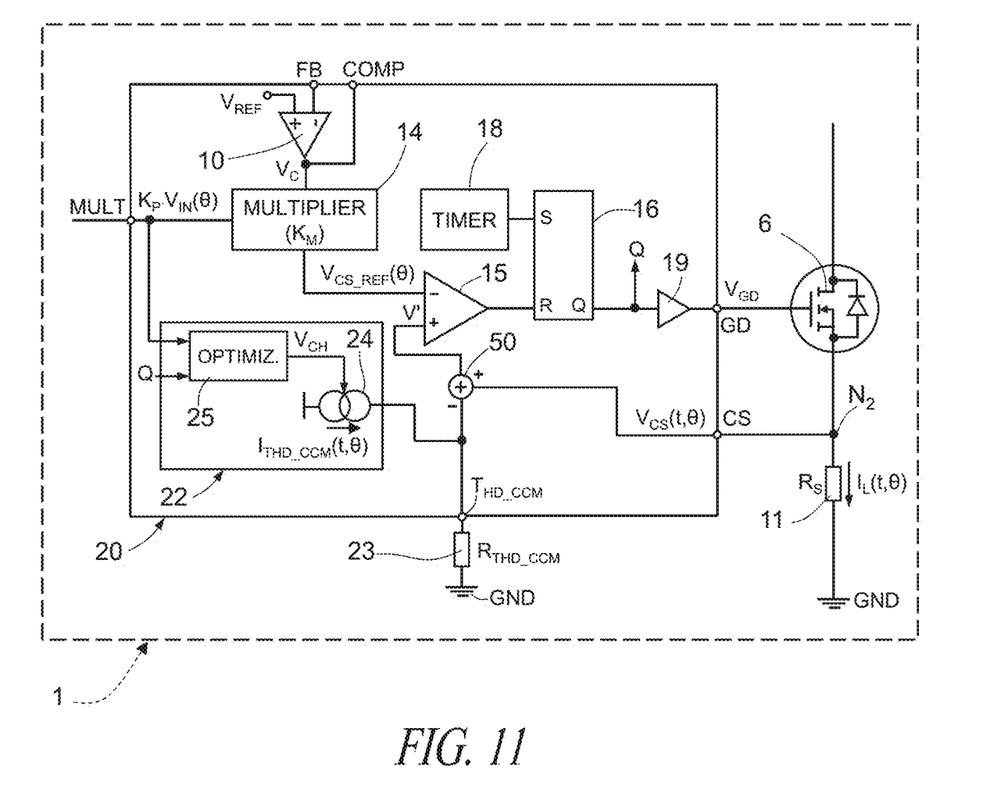
FIG. 11 is a block diagram of a control unit of a switching converter, for example the voltage converter shown in FIG. 1, according to yet another embodiment of the present solution.

In particular and as illustrated in FIG. 11, another embodiment of the control unit, also indicated using reference sign 20, may provide a different solution for changing the current reference for controlling the peak value of the inductor current $I_L$.

In this case, the control unit 20 has an additional pin THD_CCM, that forms an additional input dedicated to optimizing performance.

In this case, the optimization current $I_{THD\_CCM}$ is supplied at this additional input THD_CCM (the output of the first current source 24 is connected to the same additional input) and the optimization resistor 23 is connected between the aforementioned additional input THD_CCM and the reference ground terminal.

The control unit 20 also includes a summing block 50 that has a subtractor input connected to the input THD_CCM and designed to receive the offset voltage $V_{OS,THD\_CCM}$, a summing input connected to the input CS and designed to receive the sensing voltage $V_{CS}$, and an output connected to the first comparison terminal of the comparator stage 15 that generates the comparison voltage V', which is compared with the reference voltage $V_{CS\_REF}$.

It is immediately clear that the following expressions are also true in this case:

$$I_{L,pk}(\theta) = \frac{V_{CS,REF}(\theta) + V_{OS,THD\_CCM}(\theta)}{R_S}$$

$$V_{OS,THD\_CCM}(\theta) = R_{THD\_CCM} \cdot I_{THD\_CCM}(\theta)$$

In other words, the optimization current $I_{THD\_CCM}$ again enables a desired current offset to be added to the programmed peak current, in a manner entirely similar to the embodiments described above.

In general, it is obvious that the reference modification stage 22 works such that the comparison voltage V' is the combination, in particular linear, of the voltage at the ends of the sensing resistor connected in cascade to the switch element 6 and the offset voltage $V_{OS,THD\_CCM}$.

Figure 12:
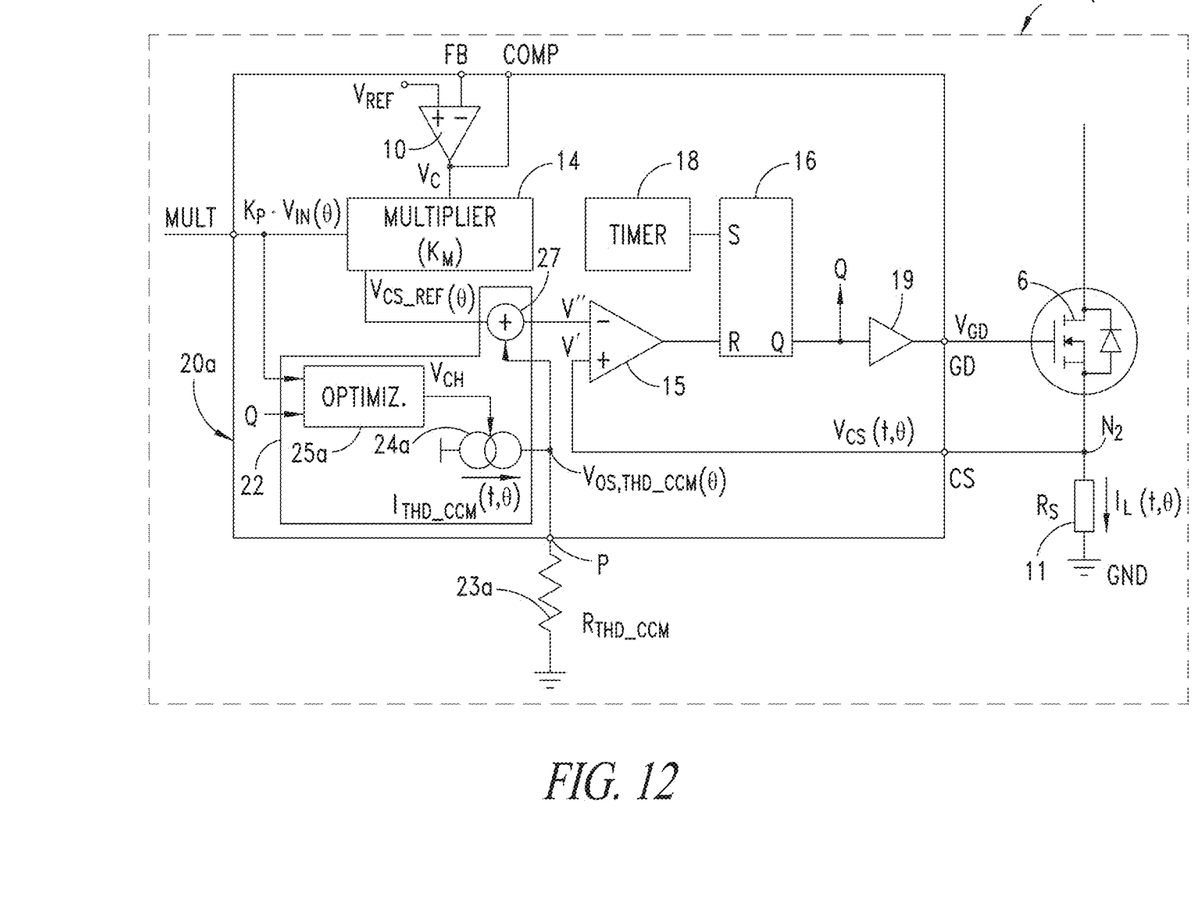
FIG. 12 is a block diagram of a control unit of a switching converter, for example the voltage converter shown in FIG. 1, according to a still further embodiment of the present solution.

FIG. 12 is a block diagram of another embodiment of a control unit, indicated using reference number or sign 20a, of a switching converter such as the voltage converter 1 of FIG. 1. Compared to the embodiments of FIGS. 4, 7 and 11, in the embodiment of FIG. 12 the reference voltage $V_{CS\_REF}$ ($\theta$) is modified directly to compensate for the effect of the current ripple $\Delta I_L$ on the input current $I_{IN}$ to obtain a reduced distortion factor THD (ideally zero) and a power factor PF that is ideally unitary for the switching converter, as will be now be described in more detail. In the embodiment of FIG. 12, components that are the same as components in the embodiment of FIG. 4 have been given the same reference numbers.

In the embodiment of FIG. 12, the control unit 20a includes a first current source 24a coupled to receive a command voltage $V_{CH}$ from an optimization block 25a. The first current source 24a provides an optimization current $I_{THD\_CCM}$ that is based on command voltage $V_{CH}$ The optimization block 25a has a first input coupled to the MOLT input on which the first division voltage $V_{P1}$ proportional to the input voltage $V_{IN}$ is received ($V_{P1} = K_p \cdot V_{IN}$), and a second input coupled to the output Q of the SR latch 16, from which the related latch signal is received, also indicated using reference sign Q. Instead of the first current source 24a being coupled to the pin or input CS of the control unit 20a, the first current source is coupled to a separate pin or input P of the control unit. An optimization resistor 23a having a resistance $R_{THD\_CCM}$ is coupled between the input P and ground and an offset voltage $V_{OS,THD\_CCM}(\theta)$ is generated on the input in response to the optimization current $I_{THD\_CCM}$ where $V_{OS,THD\_CCM}(\theta) = R_{THD\_CCM} \cdot I_{THD\_CCM}(\theta)$.

In the embodiment of FIG. 12, the input CS of the control unit 20a is coupled to the non-inverting input of the comparator stage 15 and the sensing voltage $V_{CS}(t,\theta)$ generated across the sensing resistor 11 in response to the inductor current $I_L(t, \theta)$ is accordingly provided to this non-inverting input. The voltage supplied to the non-inverting input of the comparator stage 15 has been designated as the comparison voltage V', and thus in this embodiment the comparison voltage is equal to the sensing voltage $V_{CS}(t,\theta)$ (i.e., V'=$V_{CS}(t,\theta)$). The control unit 20a further includes an adder or summation circuit 27 having a first input coupled to the input P to receive the offset voltage $V_{OS,THD\_CCM}(\theta)$ and a second input coupled to the multiplier stage 14 to receive the reference voltage $V_{CS\_REF}(\theta)$. The summation circuit 27 provides a second comparison voltage V" that is equal to the sum of the reference voltage $V_{CS\_REF}(\theta)$ and the offset voltage $V_{OS,THD\_CCM}(\theta)$. In this way, the reference current as indicated by the reference voltage $V_{CS\_REF}(\theta)$ is adjusted or modified in the embodiment of FIG. 12. This is in contrast to the embodiments of FIGS. 4, 7 and 11 in which the sensed current as indicated by the sensing voltage $V_{CS}(t,\theta)$ is modified.

As discussed above, the input current $I_{IN}$ may be expressed as:

$$I_{IN}(\theta) = I_{L,pk}(\theta) - \frac{\Delta I_L(\theta)}{2}$$

where $\Delta I_L(\theta)$ is the current ripple of the inductor current and $I_{L,pk}(\theta)$ is the peak value of the inductor current $I_L$. In the embodiment of FIG. 12, a suitable offset proportional to the current ripple $\Delta I_L(\theta)$ is added to the reference voltage VCS_REF ($\theta$) to cancel out the effect of the current ripple in the above expression for the input current $I_{IN}(\theta)$. The peak value of the inductor current $I_{L,pk}(\theta)$ is $I_{L,pk}(\theta) = I_{LPK} \sin \theta$ as discussed above, and therefore if the current ripple portion of the above equation, namely $\Delta I_L(\theta)/2$, is eliminated, then the input current $I_{IN}(\theta)$ is sinusoidal, resulting in a greatly reduced distortion factor THD and a power factor PF that is approximately equal to 1 for the voltage converter 1 of FIG. 12. In view of the detailed discussion above in relation to the embodiments of FIGS. 4, 7 and 11 resulting in a substantially sinusoidal input current $I_{IN}(\theta)$, one skilled in the art will understand that the embodiment of FIG. 12 similarly results in such a sinusoidal input current, and thus, for the sake of brevity, this operation is not described in detail herein for the embodiment of FIG. 12.

It should be noted that the voltage converter 1 may be powered by a power source other than the electricity network.

Furthermore, the switching converter to which the present solution relates may advantageously form a voltage converter or regulator, as referred to in the text above, by way of non-limiting example, or a current converter or regulator (such as drive devices, drivers, for LEDs or battery chargers).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control unit configured to:
generate a command signal to control at least one switch element of a switching converter including a boost converter that includes the at least one switch element coupled to at least one inductor element, the at least one inductor element coupled to receive an inductor input voltage of the boost converter, the boost converter configured to provide an output voltage from an output of the boost converter, the command signal having a switching period that includes a first time period in which energy is being stored in said at least one inductor element, and a second time period in which stored energy is being transferred from the said at least one inductor element;
receive a sense signal having a value representative of an inductor current of the at least one inductor element, the command signal generated based on a comparison between the value and a reference signal that is a function of the inductor input voltage and the output voltage, and
the control unit having a first terminal for coupling to a node of the boost converter and including a reference modification stage configured to:
receive the command signal; and
generate, based on the command signal, an offset proportional to a current ripple of the inductor current, the control unit configured to introduce the offset to a current flowing through the boost converter via the first terminal, causing an input current to an input of the boost converter to correspond to a desired sinusoidal waveform.

2. The control unit according to claim 1, further comprising a comparator stage having a first comparison terminal configured to receive a first comparison voltage indicative of a peak value of the inductor current, and a second comparison terminal configured to receive the reference signal, said reference modification stage is configured to control said first comparison voltage to be a combination of a voltage across a sensing resistor in series with one of said at least one switch element through which said inductor current flows, and an offset voltage that satisfies the following equation:

$$V_{OS,THD\_CCM} \approx \frac{\Delta I_L}{2} \cdot R_S$$

wherein $\Delta I_L$ represents said current ripple and $R_S$ is a resistance value of said sensing resistor.

3. The control unit according to claim 2, wherein said reference modification stage includes a first voltage-controlled current source having a first control input configured to receive a command voltage and being configured to output an optimization current, and including an optimization block configured to generate said command voltage having a value proportional to said inductor input voltage and to said first time period, wherein said optimization current generates said offset voltage across an optimization resistor.

4. The control unit according to claim 3, wherein said first voltage-controlled current source is configured to at least one of provide current to or draw current from the first terminal to generate a voltage at said first terminal that corresponds to said first comparison voltage.

5. The control unit according to claim 3, wherein the control unit includes a second terminal distinct from said first terminal, the control unit configured for connection of said sensing resistor to the first terminal, and configured for connection of the optimization resistor to the second terminal, and said first voltage-controlled current source has an output at said second terminal, the control unit further including a summing block having inputs coupled to said first terminal and to said second terminal and being configured to generate said first comparison voltage.

6. The control unit according to claim 3, wherein said optimization block further includes:
a second voltage-controlled current source having a second control input coupled to a second terminal of said control unit, the second terminal configured to receive a division of said inductor input voltage and the second voltage-controlled current source configured to output a charging current having a value that is a function of the inductor input voltage according to the following expression:

$$I_{CH}=g_{ma}K_P V_{IN}$$

where $g_{ma}$ is a transconductance of the second voltage-controlled current source and KP is a division factor of said division of the inductor input voltage;
a charging capacitor having a capacitance $C_{TR}$ that is coupled to said second voltage-controlled current source and to be charged by said charging current during said first time period; and
a maintenance capacitor having a capacitance $C_H$, the maintenance configured to be selectively coupled to said charging capacitor and configured to maintain a value of a voltage across said charging capacitor at the end of said first time period to generate said command voltage of said first voltage-controlled current source.

7. The control unit according to claim 6, wherein said optimization resistor has a resistance value $R_S$ given by the following expression:

$$R_{THD\_CCM} = \frac{1}{2} \frac{R_S}{L_P} \frac{1}{K_P} \frac{C_{TR}}{g_{ma} \cdot g_{mb}}$$

where $g_{mb}$ is a transconductance of the first voltage-controlled current source and $L_P$ is an inductance value of said at least one inductor element.

8. The control unit according to claim 7, wherein said reference signal has a value equal to the product of a division of said inductor input voltage and a second comparison voltage, and wherein the control unit includes an error amplifier that generates said second comparison voltage as the difference between a division of the output voltage of said boost converter and a voltage reference.

9. The control unit according to claim 8, further including:
a set/reset latch having a reset input coupled to an output of the comparator stage, a set input coupled to a timer stage that generates a set signal based on the determination of a duration of the second time period, and a latch output that supplies the command signal; and a drive unit coupled to the set/reset latch and configured to transform the command signal into a drive voltage configured to control switching of the at least one switch element.

10. A switching converter, comprising:

boost converter circuitry including:
  a switch element coupled to an inductor element, the inductor element coupled to an input of the boost converter circuitry to receive an inductor input voltage, and the switch element configured to transition between a first switching state and a second state based on a command signal received by the switch element; and
  an output configured to be coupled to a load and coupled to the inductor element; and
a control unit having at least a first terminal coupled to a node of the boost converter circuitry, the control unit configured to:
  sense a first value of the inductor current in the inductor;
  compare the first value with a second value of a reference signal that is a function of the inductor input voltage and the output voltage;
  generate, based on a result of comparison of the first value with the second value, a command signal having a switching period that includes a first time period in which energy is stored in the inductor element and that includes a second time period in which stored energy is transferred from the inductor element; and
  generate, based on the command signal, an offset signal proportional to a current ripple of the inductor element, the offset signal introduced via the first terminal to a current flowing through the boost converter circuitry and modifying an input current to the input of the boost converter circuitry to correspond to a desired sinusoidal waveform.

11. The switching converter of claim 10, wherein the boost converter circuitry is configured to operate in continuous-conduction mode and with peak-current mode control.

12. The switching converter according to claim 10, wherein the control unit further comprises a reference modification stage configured to control a current flowing through the node to compensate for a distortion of the input current relative to the desired sinusoidal waveform of the input current, the distortion being caused by the current ripple on the inductor current.

13. The switching converter of claim 10, further comprising:
  an input stage coupled to a power source configured to supply an input voltage; and
  an output stage configured to supply a regulated magnitude to the load as a function of the output voltage,
  wherein the control unit is configured to control a power factor correction in a power absorption from the power source.

14. A method, comprising:
  generating a command signal having a switching period to control switching of a switch element contained in a boost switching converter including an inductive element coupled to the switch element, the inductive element coupled to receive an inductor input voltage;
  determining, in the switching period, a first time period in which energy is being stored in the inductive element;
  determining, in the switching period, a second time period in which energy is being transferred from the inductive element;
  receiving a reference signal based on an inductor input voltage and an output voltage of the boost switching converter;
  sensing a value of an inductor current through the inductive element, the command signal generated based on a comparison between the value of the inductor current through the inductive element and a value of the reference signal; and
  introducing, based on the command signal, an offset to a current flowing through a node of the boost switching converter, the offset being proportional to a current ripple of the inductor current and causing an input current of the boost switching converter to correspond to a desired sinusoidal waveform.

15. The method of claim 14, further comprising:
  generating a current sense voltage across a sensing resistor in response to the inductor current flowing through the sensing resistor,
  wherein introducing the offset to the current includes generating an offset voltage given by the equation:

$$V_{OS,THD\_CCM} \approx \frac{\Delta I_L}{2} \cdot R_S$$

where $\Delta I_L$ represents the current ripple and $R_S$ is a resistance value of the sensing resistor.

16. The method of claim 15, wherein generating the offset voltage comprises generating the offset voltage having a polarity that is opposite of a polarity of the current sense voltage.

17. The method of claim 14, wherein introducing the offset to the current flowing through the node of the switching converter includes:
  generating a charging current based upon the inductor input voltage;
  charging a capacitor with the charging current to generate a charging voltage across the capacitor;
  sampling the charging voltage to provide a command voltage; and
  generating an optimization current based on the command voltage, the optimization current introduced to the current flowing through the node of the switching converter to modify the input current.

18. The control unit according to claim 1, wherein the reference modification stage is configured to compensate for a distortion, of the input current of the boost converter in relation to the desired sinusoidal waveform, introduced by a distortion factor caused by the current ripple on said inductor current.

19. The control unit according to claim 1, wherein the offset is a current offset added to the inductor current via the first terminal.

20. The control unit according to claim 1, wherein the reference modification stage is coupled to receive a voltage proportional to the inductor input voltage and includes an active source that generates the offset using the voltage.

21. The control unit according to claim 1, wherein the control unit is configured for connection of the first terminal to the node of the boost converter on a ground return side of the at least one switching element.

* * * * *